United States Patent
Taylor et al.

(10) Patent No.: US 9,342,292 B2
(45) Date of Patent: *May 17, 2016

(54) CUSTOMER RELATIONSHIP MANAGEMENT SYSTEM AND METHOD

(71) Applicant: SugarCRM Inc., Cupertino, CA (US)

(72) Inventors: Jacob Taylor, Santa Clara, CA (US); John Roberts, San Jose, CA (US); Clinton Oram, San Mateo, CA (US); Andy Dreisch, San Jose, CA (US); Ajay Gupta, Cupertino, CA (US); Majed Itani, San Jose, CA (US); Julian Ostrow, Cupertino, CA (US); Joseph Parsons, Austin, TX (US)

(73) Assignee: SugarCRM Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/931,988

(22) Filed: Jun. 30, 2013

(65) Prior Publication Data

US 2013/0298114 A1    Nov. 7, 2013

Related U.S. Application Data

(63) Continuation of application No. 12/185,001, filed on Aug. 1, 2008, now Pat. No. 8,489,543.

(51) Int. Cl.
| | |
|---|---|
| *G06F 9/445* | (2006.01) |
| *G06F 9/44* | (2006.01) |
| *G06F 17/30* | (2006.01) |
| *G06Q 10/06* | (2012.01) |
| *G06Q 10/10* | (2012.01) |
| *G06Q 30/02* | (2012.01) |

(52) U.S. Cl.
CPC .. *G06F 8/65* (2013.01); *G06F 8/71* (2013.01); *G06F 17/30312* (2013.01); *G06Q 10/06* (2013.01); *G06Q 10/10* (2013.01); *G06Q 30/02* (2013.01)

(58) Field of Classification Search
CPC .................................................. G06F 17/30312
See application file for complete search history.

(56) References Cited

U.S. PATENT DOCUMENTS

| | | | |
|---|---|---|---|
| 2008/0196008 A1* | 8/2008 | Branton et al. | 717/120 |
| 2009/0271768 A1* | 10/2009 | Goodson | 717/125 |
| 2009/0271779 A1* | 10/2009 | Clark | 717/171 |
| 2009/0328024 A1* | 12/2009 | Li et al. | 717/169 |

* cited by examiner

*Primary Examiner* — Rehana Perveen
*Assistant Examiner* — Raheem Hoffler
(74) *Attorney, Agent, or Firm* — Steven M. Greenberg, Esq.; CRGO Law (57) ABSTRACT

A software-based customer relationship management system and method.

8 Claims, 8 Drawing Sheets

```
$INSTALLDEFS = ARRAY(
   'ID => 'SONGS'
   'IMAGE_DIR'=> '<BASEPATH>/IMAGES',
   'COPY' => ARRAY(
      ARRAY('FROM'=> '<BASEPATH>/MODULE/SONGS',
         'TO'=> 'MODULES/SONGS', ),
   ),

'LANGUAGE'=>
   ARRAY(ARRAY('FROM'=>'<BASEPATH>/APPLICATION/APP_STRINGS.PHP
',
   'TO_MODULE'=> 'APPLICATION','LANGUAGE'=>'EN_US'),

ARRAY('FROM'=>
'<BASEPATH>/ADMINISTRATION/EN_US.SONGSADMIN.PHP',
      'TO_MODULE'=> 'ADMINISTRATION','LANGUAGE'=>'EN_US')
         ),
   'ADMINISTRATION'=> ARRAY(
   ARRAY('FROM=>'<BASEPATH>/ADMINISTRATION/SONGSADMINOPTION.P
HP',
            ),
            ),
   'BEANS'=>ARRAY(
      ARRAY('MODULE'=> 'SONGS','CLASS'=> 'SONG',
         'PATH'=> 'MODULES/SONGS/SONG.PHP','TAB'=> TRUE,)
   ),
   'RELATIONSHIPS'=>ARRAY(
      ARRAY('MODULE'=> 'CONTACTS',
   'META_DATA'=>'<BASEPATH>/RELATIONSHIPS/CONTACTS_SONGSMETADA
TA.PHP',

'MODULE_VARDEFS'=>'<BASEPATH>/VARDEFS/COONTACTS_VARDEFS.PHP'
         ),
         ARRAY(
            'MODULE'=> 'PRODUCTS',

'META_DATA'=>'<BASEPATH>/RELATIONSHIPS/PRODUCTS_SONGSMETADA
TA.PHP',

'MODULE_VARDEFS'=>'<BASEPATH>/VARDEFS/PRODUCTS_VARDEFS.PHP'
            )
         ),
```

FIG. 5A

```
'CUSTOM_FIELDS'=>ARRAY(
            //WILL BE REFERENCED AS SUDO_NAME_C
- _C INDICATES A CUSTOM FIELD
            //CURRENT TYPES ARE
TEXT,TEXTAREA,DOUBLE,FLOAT,INT,DATE,BOOL,ENUM (SELECT), RELATE
            ARRAY('NAME'=>'MUSIC_NAME',
                'LABEL'=>'MUSIC_NAME',
                'TYPE'=>'TEXT',
                'MAX_SIZE'=>255,
                'REQUIRE_OPTION'=>'OPTIONAL',
                'DEFAULT_VALUE'=>'',
                'EXT1'=>'',
                'EXT2'=>'',
                'EXT3'=>'',
                'AUDITED'=>0,
                'MODULE'=>'CONTACTS',
        ),
        ARRAY('NAME'=>'URGENT_BUG_ID',
                'LABEL'=>'URGENT MUSIC BUG',
                'TYPE'=>'RELATE',
                'MAX_SIZE'=>36,
                'REQUIRE_OPTION'=>'OPTIONAL',
                'DEFAULT_VALUE'=>'',
                'EXT1'=>'NAME',//FIELD TO GET
FROM TO MODULE (BUGS)
                'EXT2'=>BUGS',//RELATE TO
MODULE
                'EXT3=>'',
                'AUDITED'=>0,
                'MODULE'=>'CONTACTS,
//RELATE FROM MODULE
        )
        ),
),
?>
```

CUSTOMER RELATIONSHIP MANAGEMENT SYSTEM AND METHOD

CROSS-REFERENCE TO RELATED APPLICATIONS

This application claims priority to U.S. patent application Ser. No. 12/185,001, currently pending, filed Aug. 1, 2008, which claims priority to U.S. patent application Ser. No. 11/504,746, filed Aug. 14, 2006, which claims priority to U.S. Provisional Patent Application No. 60/707,820, filed Aug. 12, 2005, the entirety of which are incorporated herein by reference.

FIELD OF THE INVENTION

The invention relates generally to a customer relationship management system and method and in particular to a software-based system and method for providing customer relationship management.

BACKGROUND OF THE INVENTION

Customer relationship management (CRM) systems and solutions are well known. For example, typical known CRM systems include Microsoft® CRM, e-Synergy, a CRM product provided by SalesForce.com, Netsuite CRM, and SAP Business One CRM. However, conventional CRM systems have significant limitations that include a lack of flexibility, high costs, and a closed-source structure which is embedded into the traditional product offerings. These limitations have led to a failure rate of over 70% with traditional CRM implementations. Thus, it is desirable to provide a customer relationship management system and method that overcomes these limitations of typical CRM systems and it is to this end that the invention is directed.

SUMMARY OF THE INVENTION

In accordance with the invention, a novel customer relationship management system and method are provided. In a preferred embodiment, the CRM system is software based and more preferably is an open source software CRM system. The CRM system in accordance with the invention may include a process for determining the number of queries per page of the CRM application. Using this determination of the number of queries per page, the developer is able to diagnose performance issues during development and to quickly isolate the source of queries in the CRM application.

The CRM system may also include a module loader/unloader portion that allows for easy end user administration of adding and removing components from the CRM application. The components that may be added or removed may include language packs, upgrades, new modules, and themes.

The system in accordance with the invention may also include the ability to connect to a server as a mobile client. When this is done using the system, the mobile client becomes a miniature version of the application and it will automatically synchronize all data of the specified username/password, and also synchronize the application changes that affect source code files, metadata, caches, and/or database schema. In accordance with the invention, application changes are synchronized only from the server to the client. The application data changes are synchronized bi-directionally and changes on the client and server are merged. The system may also produce encoded version of the source code before copying it to mobile clients to deter theft.

The system may also have a mechanism for tagging source code in order to use one code base for multiple products. The tags/comments are added to the files, the code, or the directories of the application. The directory level tags can be used to remove directories from specific builds or only include them in specific builds. For instance if there is a module that is in a professional and enterprise builds only and is not in an open source product, a file may be placed in that folder that tells the build process to remove the entire folder if it is not doing a professional or enterprise build of the CRM system. The file level tags can be used to remove entire files from specific builds or only include them in specific builds. The code level tags can be used to remove sections of code specific builds or only include them in specific builds. In accordance with the invention, the tags are removed from the built version of the code.

The system may also include an upgrade process that includes change detection and system verification. In some typical open source programs, the open source programs will have users unzip over their current installation so that any customizations are lost. In accordance with the invention, the upgrading process may perform change detection to ensure that changes are not lost and system verification. The system may also include PHP session security enhancements wherein PHP is a server-side, cross-platform scripting language that lets you create dynamic web pages. The system enhances the PHP session through the use of an Application GUID and IP Address tracking so that PHP sessions are tied to a specific server instance or specific server cluster and a specific client IP address.

BRIEF DESCRIPTION OF THE DRAWINGS

FIG. 2 is a diagram illustrating an example of the user interface of the system in FIG. 1;

DETAILED DESCRIPTION OF A PREFERRED EMBODIMENT

The invention is particularly applicable to an open source customer relationship management (CRM) software system and it is in this context that the invention will be described. It will be appreciated, however, that the algorithms, data structures, processes and modules in accordance with the invention has greater utility since these modules and inventive aspects disclosed herein can be equally applied to other non-open source CRM systems, as well as other business software application systems as well as other database software systems. For purposes of illustration, the described system is an implementation in a CRM and groupware system although the inventive methods apply across multiple systems. In the example, the CRM and groupware system is SugarCRM Inc.'s Sugar Professional 3.5. It is a database driven application that demands quick response time.

The system may be implemented in a preferred embodiment using a base class known as SugarBean, and a data retrieval API. The base class has methods for building list queries, saving, and retrieving individual items. Each specific type of data creates a subclass of this base class. In a preferred embodiment of the invention, the base class is called SugarBean. There is at least one subclass of SugarBean for each module. SugarBeans are used for creating database tables, cleaning out database tables, loading records, loading lists, saving records, and maintaining relationships. One example of a SugarBean subclass is Contact. Contact is a simple object that fills in some member variables on the SugarBean and leverages SugarBean for much of its logic. Security for instance, is automatically created for Contact. Another example of a SugarBean subclass is Users which is a module that is security related and should not have row level security applied to them. For this reason these modules have the bypass flag set to skip adding the right join for verifying security. The SugarCRM Sugar Professional system is a web based system with many concurrent users. Since this program contains critical data to the users, it is imperative that they have quick access to the system and their data. The most frequent activity in an SFA application is to look at existing data.

Figure 1:
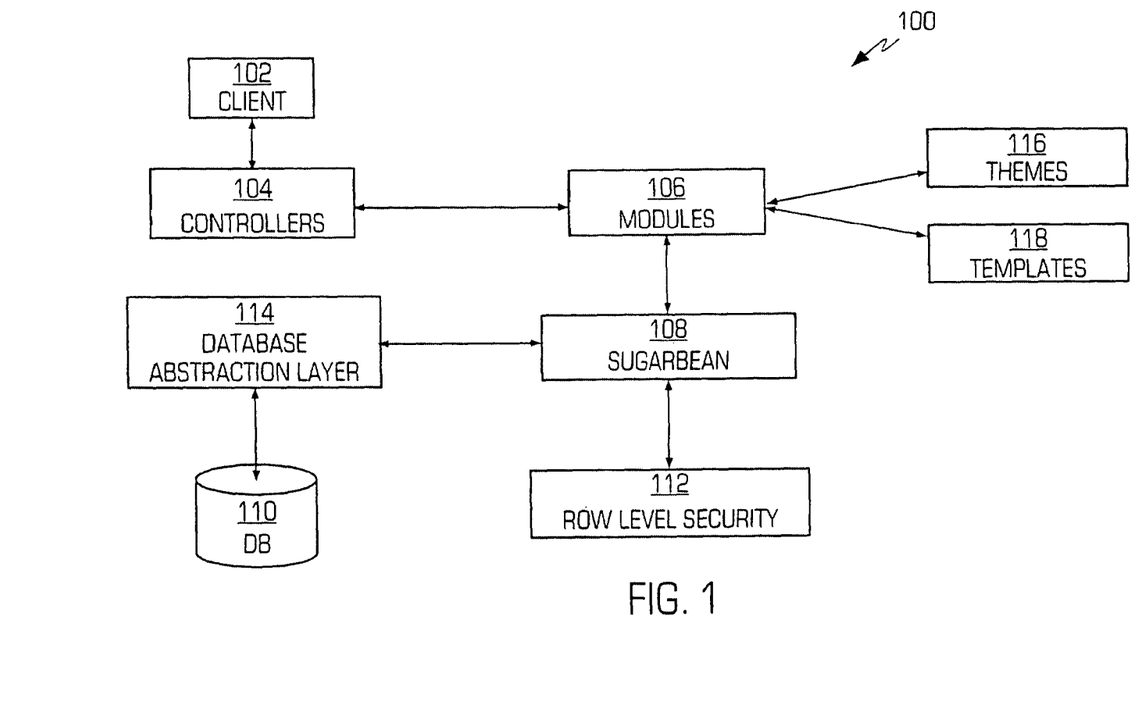
FIG. 1 is a diagram illustrating a customer relationship management system in accordance with the invention that incorporates the various features of the invention.

FIG. 1 is a diagram illustrating a customer relationship management (CRM) system 100 in accordance with the invention. In a preferred embodiment, the system 100 in accordance with the invention is implemented as a software system that may preferable use open source code. In the preferred embodiment, the elements shown in FIG. 1 are thus implemented as a plurality of lines of computer code that may be executed by a processor of a computer system, such as a server computer wherein the various lines of computer code are stored in a memory associated with the computer system and the system interfaces with a database 110. The system may have one or more clients 102, such as a browser application executed on a typical computing device (a browser client session), that accesses the system over a computer network 103 such as the Internet. The client 102 interactions go through a set of one or more controllers 104. The controllers are the entry-point into the system and take care of things like session tracking and session security and end user authentication. The controllers also take care of the work to prepare the screen or the wrapper for the content and determine which module of the application the user is trying to access and get the requested module to process the request. The system thus has one or more modules 106 that are components of application functionality and provide certain functionality. The modules 106 of the CRM system may include, by way of example, a portal module, a calendar module, an activities module, a contacts module, an accounts module, a leads module, an opportunities module, a quotes module, a products module, a cases module, a bug tracker module, a documents module, an emails module, a campaigns module, a project module, an RSS module, a forecasts module, a reports module and a dashboard module. Each of these modules provides a different functionality to the system so that, for example, the calendar module provides a calendaring functionality to the CRM system that is instantiated with the system. The system may also include an administration module that handles the typical administrative functions of the system. Each module contains a subclass of a SugarBean base object 108 and each module references the SugarBean to retrieve the data from the database 110 required for display.

FIG. 2 is a diagram illustrating an example of the user interface 120 of the system in FIG. 1. The user interface may include a home tab 121 (that is selected in FIG. 2) that provides a general overview of Cases, Opportunities, Appointments, Leads, Tasks, Calendar, Team Notices, and Pipeline. The home tab also includes shortcuts to enter most sorts of data, and a quick form for new contacts. The home tab also provides a quick overview of what customer tasks and activities you need to focus on today. The portal module (selected using a my portal tab 122), contains a series of shortcuts which can link to any web site you choose that may include e-mail, forums, or any other web-based application, allowing the system to become a single user interface for multiple applications. The calendar module may be selected by a calendar tab 124 and allows the user to view scheduled activities (by day, week, month or year), such as meetings, tasks, and calls. The system also allows the user to share his/her calendar with coworkers which is a powerful tool for coordinating the daily activities. The activities module is selected using an activities tab 126 and allows the user to create or update scheduled activities, or to search for existing activities. By managing Activities within the context of an Account, Contact, Lead, Opportunity, or Case, the system allows the user to manage the myriad of calls, meetings, notes, emails and tasks that the user needs to track in order to get the job done. The tasks are for tracking any action that needs to be managed to completion by a due date, the notes allow the user to capture note information as well as upload file attachments, the calls allow the user to track phone calls with leads and customers, meetings are like calls, but also allow the user to track the location of the meeting and emails allow the user to archive sent or received email messages.

The contacts module is accessed by a contacts tab 128 and allows the user to view a paginated contact list, or search for a contact. The user can click on a specific contact to zoom in on the detailed contact record and, from a specific contact record, the user may link to the related account, or leads, opportunities, cases, or direct reports (related contacts). Within the system, contacts are the people with whom the organization does business. As with accounts, the system allows the user to track a variety of contact information such as title, email address, and other data. Contacts are usually linked to an Account, although this is not required. The accounts module may be accessed using an accounts tab 130 and the user may view a paginated account list, or search for an account. The user can click on a specific account to zoom in on the detailed account record and, from a specific account record, the user may link to related contacts, activities, leads, opportunities, cases, or member organizations. Accounts are the companies with which the organization does business and the system allows the user to track a variety of information about an account including website, main address, number of employees and other data. Business subsidiaries can be linked to parent businesses in order to show relationships between accounts.

The leads module may be accessed by a leads tab 132 that permits the user to view a paginated list of leads, or search for a specific lead. The user can click on an individual lead to zoom in on the lead information record and, from that detailed lead record, the user can link to all related activities, and see the activity history for the lead. Leads are the people or companies with whom the organization might do business in the future. Designed to track that first point of interaction with a potential customer, leads are usually the hand off between the marketing department and the sales department. Not to be confused with a contact or account, leads can often contain incomplete or inaccurate information whereas contacts and accounts stored in Sugar Professional are core to many business processes that require accurate data. Leads are typically fed into the Sugar Professional system automatically from your website, trade show lists or other methods. However, the user can also directly enter leads into Sugar Professional manually.

The opportunities module is accessed by an opportunities tab 134 and permits the user to view a paginated list of opportunities, or search for a specific opportunity. The user can click on an individual opportunity to zoom in on the opportunity information record and, from that detailed opportunity record, the user can link to all related activities, see the activity history for the opportunity, and link to related leads and contacts. Opportunities track the process of selling a good or service to a potential customer. Once a selling process has commenced with a lead, a lead should be converted into a contact and possibly also an account. Opportunities help the user manage the selling process by tracking attributes such as sales stages, probability of close, deal amount and other information. The quotes module may be accessed by a quotes tab 136 and permits the user to view a paginated list of customer quotes, or search for a specific quote. The user can click on an individual quote to zoom in on the detailed quote information. A quote is formed by referencing product and pricing from a catalog of products you may create. A presentation quality Portable Document Format (PDF) representation of the quote may be created to fax or email to a client. Quotes may be associated with Accounts, Contacts, or Opportunities.

The products module may be accessed by a products tab 138 and permits the user to view a paginated list of products, or search for a specific product. The user can click on an individual product to zoom in on the detailed product information. A product is used when assembling a customer quote. The cases module may be accessed using a cases tab 140 and may permit the user to view a paginated list of cases, or search for a specific case. The user can click on an individual case to zoom in on the case information record and, from that detailed case record, the user can link to all related activities, see the activity history for the case, and link to related contacts. The cases are the handoff between the sales department and the customer support department and help customer support representatives manage support problems or inquiries to completion by tracking information for each case such as its status and priority, the user assigned, as well as a full trail of all related open and completed activities. The bug tracker module may be accessed using a bug tracker tab 142 and permits the user to view a paginated list of reported software bugs. The user can click on an individual bug to zoom in on the detailed bug report and, from that detailed bug report, the user can link to all related activities, see the activity history for the bug, and link to related Contacts, Accounts, and Cases. The tracking software bugs is an important function of a customer support department. The Bug Tracker module helps customer support representatives manage software-related support problems or inquiries to completion by tracking information for each bug such as its status and priority, its resolution, the user assigned, the release of software involved, its type (defect or feature) as well as a full trail of all related open and completed activities.

The documents module may show the user a list of documents that the user can download. The user can also upload documents, assign publish and expiration dates, and specify which users can access them. The email module allows the user to write and send emails and to create Email Templates that can be used with email-based marketing campaigns. The user can also save drafts and archive emails. The campaigns module helps the user implement and track marketing campaigns wherein the campaigns may be telemarketing, mail or email based. For each Campaign, the user can create the Prospects list from the Contacts or Leads or outside file sources. The projects module helps the user manage tasks related to specific projects. Tasks can be assigned to different users and assigned estimated hours of effort and, as tasks are in progress and completed, users can update the information for each task. The RSS module permits the user to view the latest headlines provided by your favorite RDF Site Summary (RSS) feeds. These feeds provide news or other web content that is distributed or syndicated by web sites which publish their content in this manner. The system has hundreds of RSS feeds available as supplied, and others may easily be added.

The forecasts module shows the user his/her committed forecast history and current opportunities. For managers, the user can view your team's rolled up forecasts. The reports module shows the user a list of saved custom reports not yet published, as well as a list of Published Reports. Saved reports may be viewed, deleted or published, and published reports may be viewed, deleted or un-published. Clicking on the name of a report zooms to the detailed definition of the report criteria (fields to be displayed, and filter settings) for that report, permitting the user to alter the criteria, and re-submit the report query. Finally, the dashboard module displays a graphical dashboard of the user's Opportunity Pipeline by Sales Stage, Opportunities by Lead Source by Outcome, Pipeline by Month by Outcome, and Opportunities by Lead Source.

Returning to FIG. 1, the system also includes the database 110 that contains the data of the system and a security module 112 that implements the security methods to control access to the data in the database 110. The system may also include a database abstraction layer 114 that is coupled between the database 110 and the SugarBean object 108 in order to by an interface between the database 110 and the SugarBean object 108. The SugarBean object 108 provides the base logic required for retrieving and making available information from the database and each module creates subclasses of SugarBean to provide module specific details. During the process of retrieving data from the database, the SugarBean 108 makes calls that populate the row level security information into the SQL that retrieves the data.

Once the data is retrieved from the SugarBean object 108, the module uses a template mechanism 118 and a theme 116 to produce the requested presentation for the user. The template mechanism reformats the data from the database 110 into a particular form while the theme adjusts the user interface according to the user's preferences. If, for instance, the user requests an HTML presentation of the detail view of the contact module for a specified contact, here is the flow of what happens. The user hits the controller named index.php. It handles most of the logic for the main application. The index controller loads the current user, verifies authentication and session information, loads the language for the user and produces some of the UI shell. It then calls the contact module and request the detail view for the specified contact. The contact module retrieves the SugarBean for the requested contact. The SugarBean verifies row level security at this point. If the record is not retrieved successfully, then the process aborts and the user is not allowed to view the data for the record. If the retrieve succeeds then it uses the XTemplate mechanism and the code for the current user's theme to create the UI for presentation. The resulting UI is sent back to the client that requested it.

Figure 3:
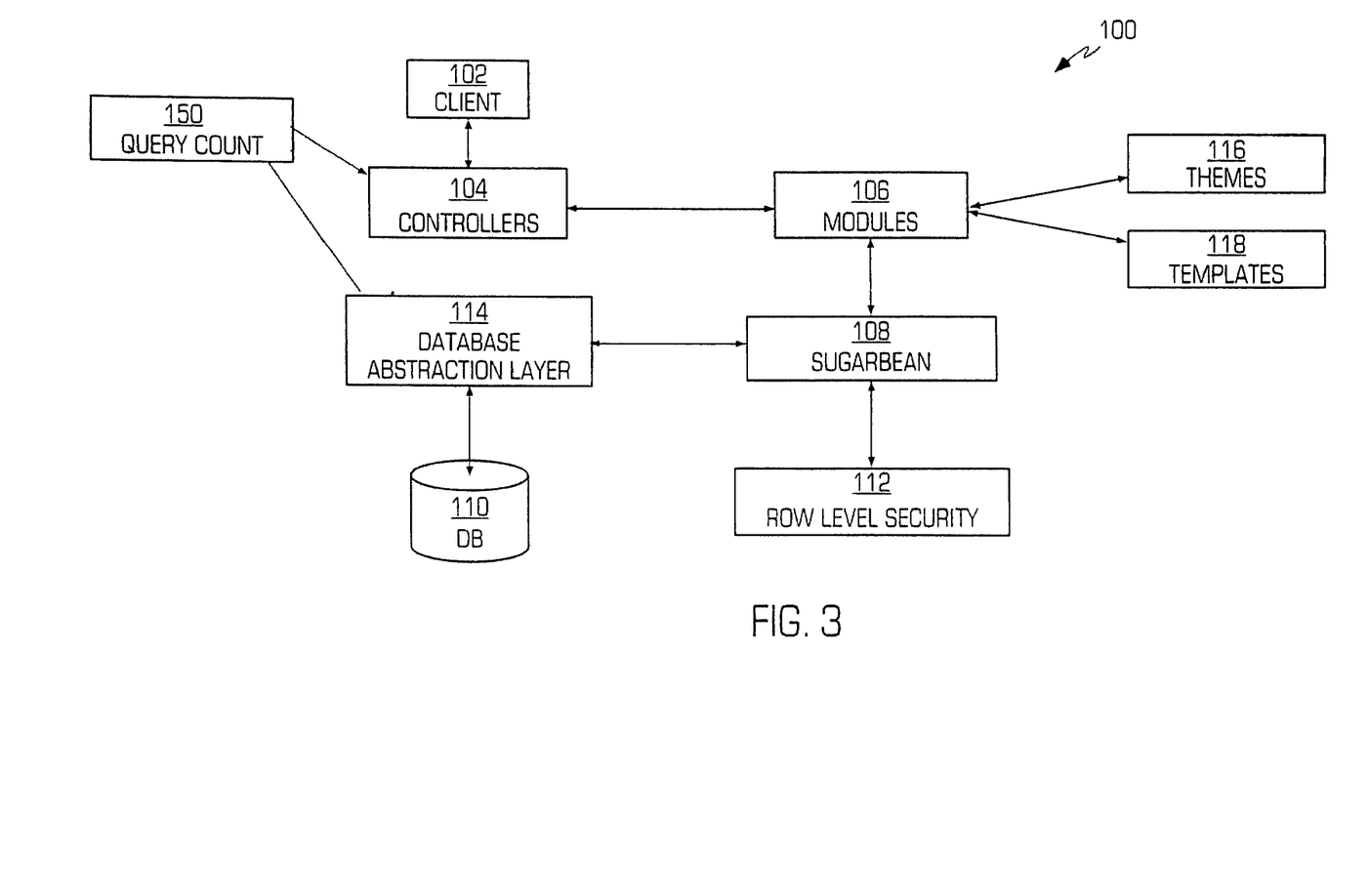
FIG. 3 is a diagram illustrating the customer relationship management system with the query counter in accordance with the invention.

FIG. 3 is a diagram illustrating the customer relationship management system 100 with the query counter in accordance with the invention. As shown, a query counter module 150 is coupled to the controllers 104 and the database abstraction layer 114. The query counter module, that may be preferably implemented as a piece of software code having a plurality of lines of computer code resident on the server computer that is executed by the processor of the server computer, determines the number of database queries on each page of the application during development and when enabled on production systems to try and demonstrate and diagnose performance issues. In more detail, the module determines, for each page on the screen, the query counts per section of the screen and for the screen as a whole. The module also provides the user with the ability to show all of the queries next to the portion of the screen that the query was executed to populate which allows developers to quickly isolate the source of queries and also gives them a quick numeric value to judge changes against during the development.

Figure 4:
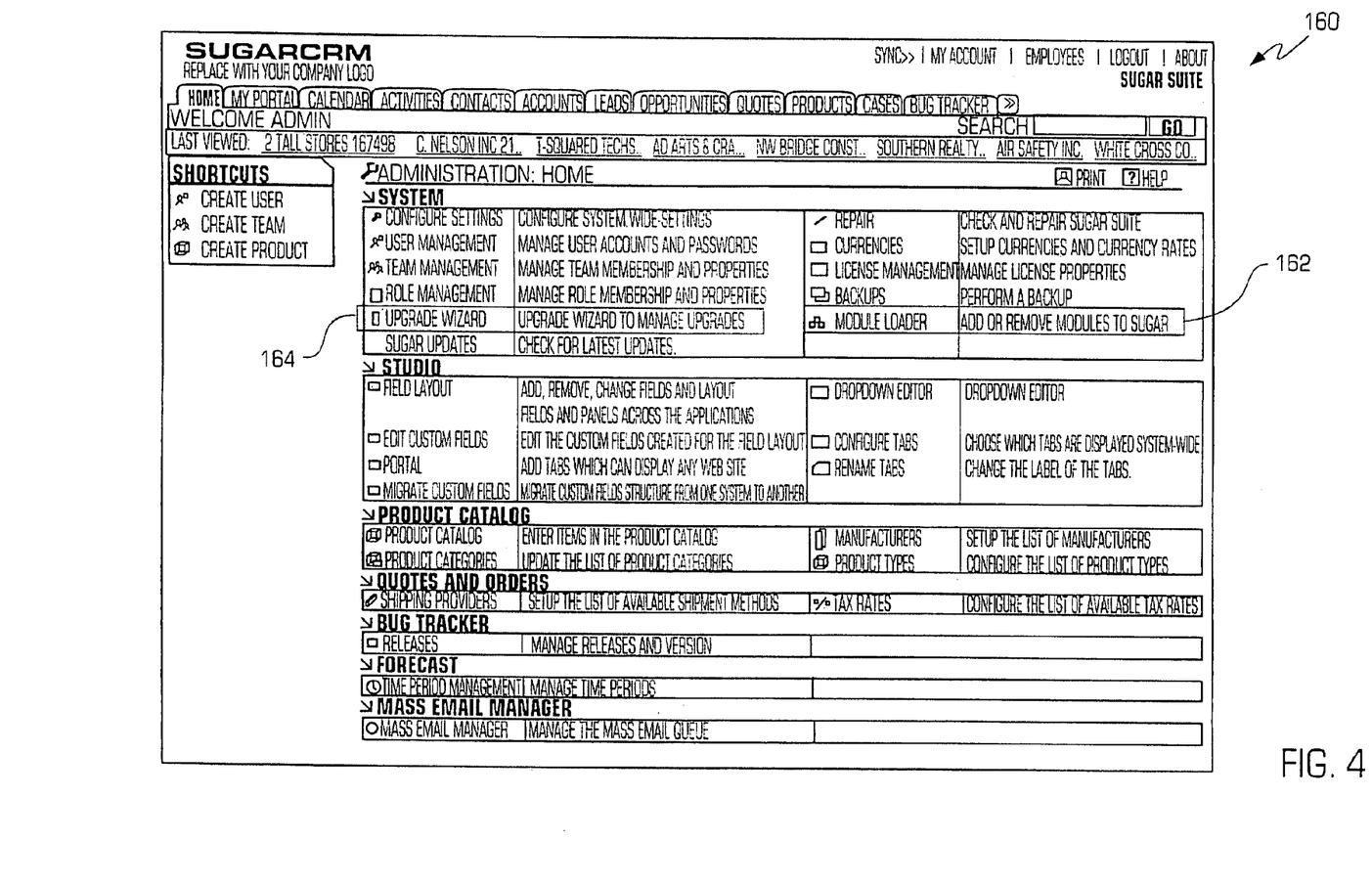
FIG. 4 is an example of a user interface of the administration module in accordance with the invention that incorporates module loader and upgrade wizard modules in accordance with the invention.

FIG. 4 is an example of a user interface 160 of the administration module in accordance with the invention that incorporates a module loader module in accordance with the invention. The administration module permits an administrator of the system to perform various administrative functions including configuring of the system. The administrator module may include a module loader module that may be selected by a module loader tab 162. The loader module allows the easy end user administration of adding and removing components from the application. These components that may be added/removed from an application that is run on the system may include language packs, upgrades, new modules, and themes. The module can basically be used to make any changes to the sugar code-base that you would want. As shown, in the administration user interface, there is a screen to upload new modules. Once a module is uploaded, it, along with details about it, is listed as available for installation. If you click install, it is installed and then moved into the installed modules list and is available for un-installation. Internally, it handles all of the file management, metadata changes, SQL, and allows for arbitrary PHP code execution.

Figure 5A:
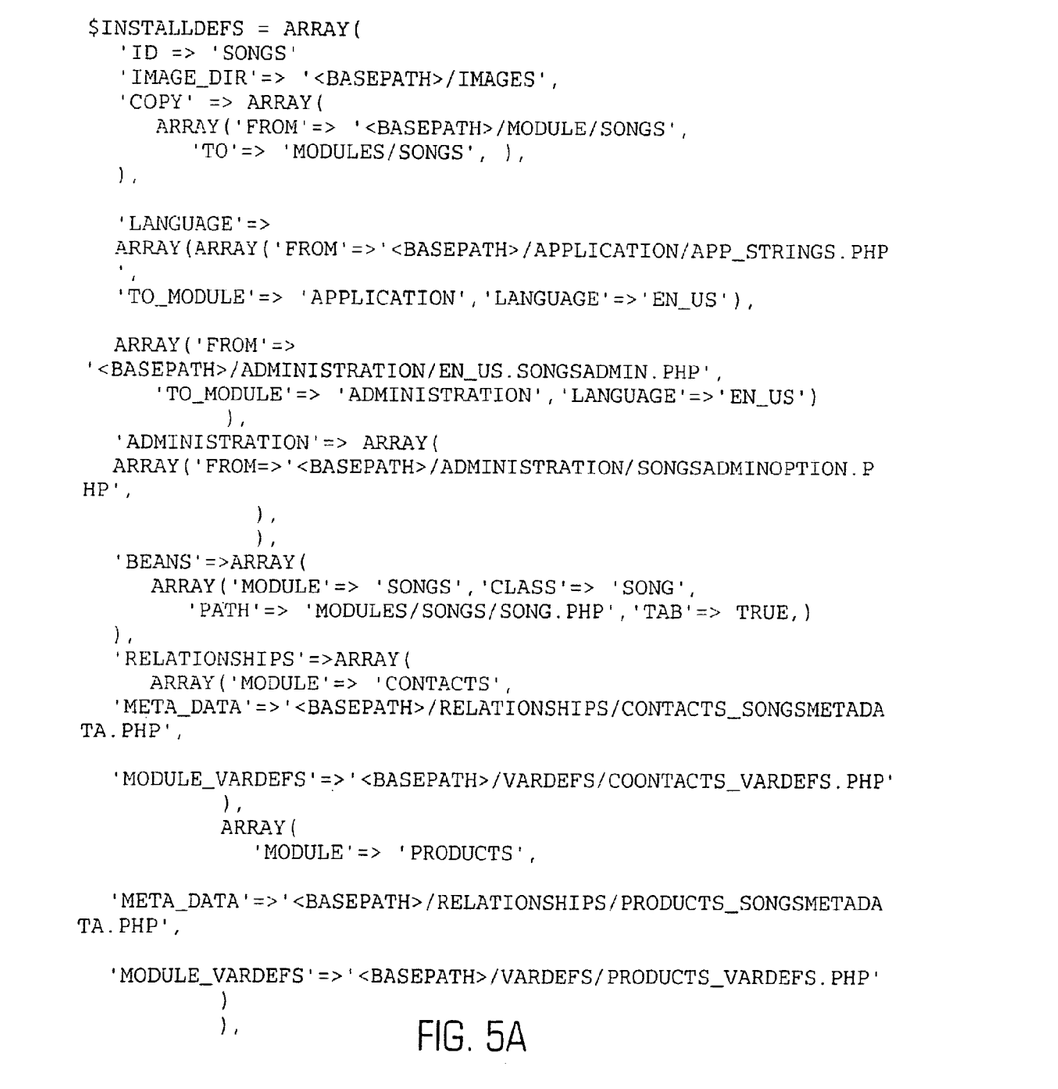
FIGS. 5A and 5B are an example of the manifest code for a module that can be loaded into the system using the module loader module.
Figure 5B:
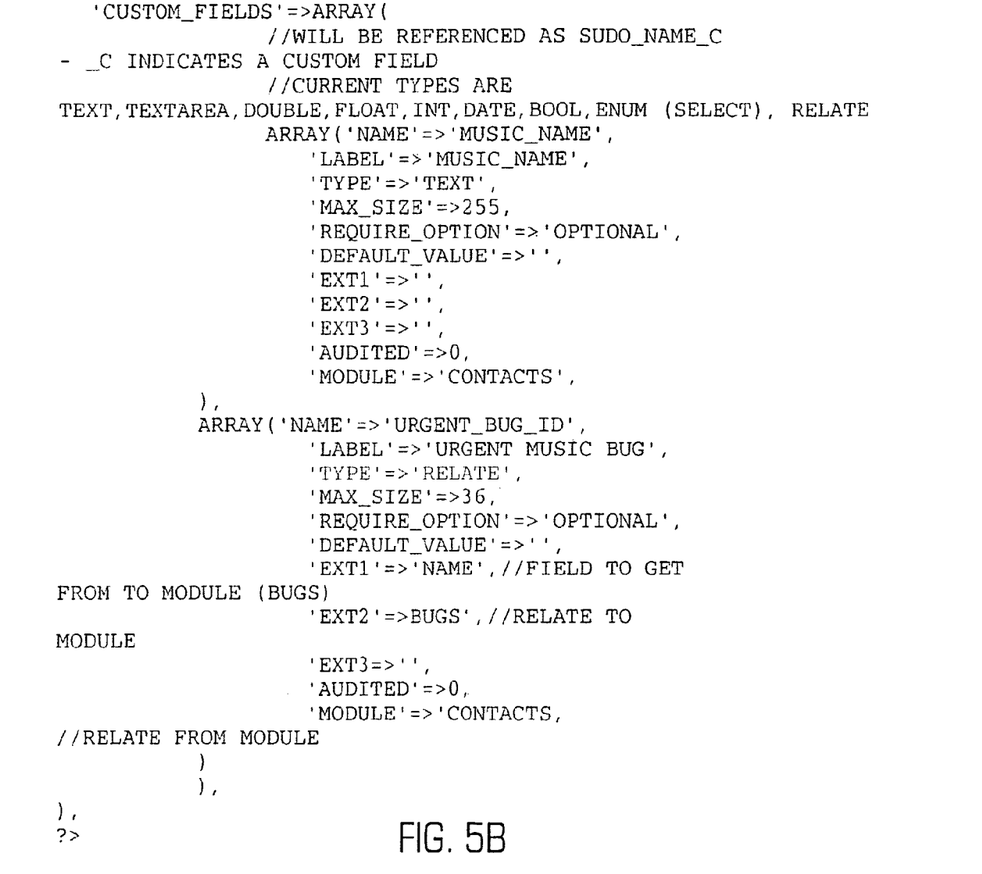

In accordance with the invention, the module loading may be implemented using a manifest file 170, an example of which is shown in FIGS. 5A and 5B. The manifest file format is used to enable loading Modules, Patches, Themes, and Language Packs, to the Sugar server/system. In the example shown in FIGS. 5A and 5B, a zip file for the "Songs" module is provided that is an example for creating your own Sugar loadable modules. The manifest file format is used for the module loader as well as an upgrade wizard as described below in more detail.

The manifest file format is shown in the sample module "Songs" as an example to see how files should be formatted and how the loading mechanism and manifest file works. The manifest file may include an "Acceptable_sugar_versions" variable that contains the version of the sugar server that must be present to load this module. The format of the version dependency check can be provided as an exact match, or as a regex comparison. The manifest file may also include an "Acceptable_sugar_flavors" variable that specifies the flavor of sugar server which currently include Open Source, Professional, and Enterprise flavors. If there are elements or dependencies on functionality in a specific flavor this parameter should be used to specify what is required. If there are no restrictions or limitations, the variable may specify all of the supported sugar flavors.

The manifest file may also include a "Name" variable that contains a user readable name for the module that this name will be displayed in the Sugar Admin interface when loading and installing the module. The manifest file may also include a "Description" variable that contains a description of the module that is displayed in the Sugar Admin interface, an "Author" variable that contains the name of the person or company that authored the module, a "Published Date" variable that contains the date the module was published or last revised and a "Version" module that contains the version that the module. The manifest file may also contain a "Type" variable that contains the type of package that is contained in the zip file. Currently the module loader only supports "Modules", and the upgrade Wizard provides support for language packs, themes, patches, and a full upgrade. The manifest file may also include an "Icon" variable that contains the relative path and name of the icon file in the zip file the Sugar Loader should use to display in the Sugar Admin interface for this module. The system will use default icons if this is left blank. Finally, the manifest file may also contain a "Copy_files" variable that is an array of file copy instructions that specify the From & To source and destination for folders and files. The processing just walks through this tree moving the files as specified, folders are copied recursively.

The system in accordance with the invention also has a novel upgrade process that is implemented from a tab 164 that launches an upgrade wizard module from the administrator user interface shown in FIG. 4. The upgrade wizard module is preferably a software module executing on the server that performs the upgrade process that includes change detection and system verification as will now be described.

Figure 6:
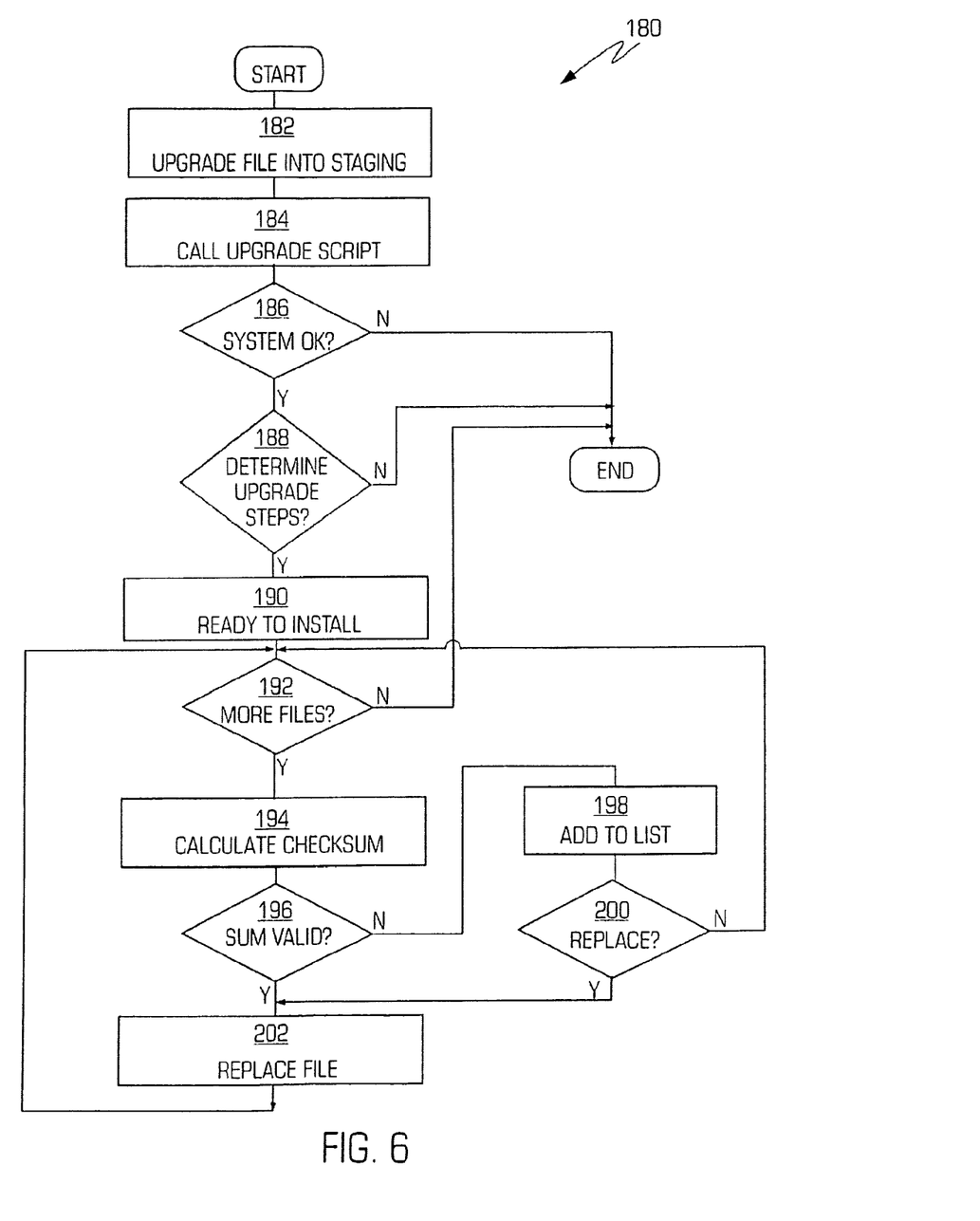
FIG. 6 is a flowchart illustrating an upgrade process in accordance with the invention.

FIG. 6 is a flowchart illustrating an upgrade process 180 in accordance with the invention. During an upgrade/update in accordance with the invention, change detection occurs that compares changes in the prior version of the code to the upgraded version. In a typical open source program, the program has the users unzip the upgrade over their current installation so that the user may loose any customizations that they may have made to the open source product. Thus, in step 182, the upgrade process starts by putting the file into a staging folder. Then, in step 184, an upgrade script is called that performs some checks on the upgrade file prior to beginning the upgrade process. In step 186, the upgrade script ensures that the system that it is upgrading is one of the known systems that it should be able to upgrade from. If the system is known, then in step 188, the upgrade script determines the upgrade steps that are needed from the specific installed version on the system since one upgrade package could support multiple prior versions and each version may have a slightly different series of upgrade steps. This makes the upgrade process much faster and easier than requiring the user to step through each version in sequence.

Now, in step 190, the upgrade is ready to install as the checks have been performed. In step 192, the upgrade process determines if there are more files in the upgrade that need to be compared. This loop ensures that all of the files contained in the upgrade are compared and handled appropriately. Thus, during the installation process, the upgrade system looks at all of the files on the system that is being upgraded. In step 194, the system calculates a checksum, that may preferably be an MD5 checksum, for a file in the upgrade. The MD5 checksum may be independent of line feeds, source code control system tags, and/or changes to whitespace in the source code. In step 196, the system determines if the checksum value is one of the known values from previous builds (with either Unix or dos line feeds) or matches a shipped version. If the sum is known, then the file is considered safe to replace since no customizations will be lost during replacement and the method loops back to step 192 to compare the checksum of the next file. If the checksum is not known, the file is added in step 198 to a list of files that will be checked by the user. Any file that is not part of that list is automatically replaced once the method is completed. The method then loops back to step 192 to compare the checksum of the next file. When all of the files in the upgrade have been checked, the method proceeds to step 200 in which the list of files whose checksums are not known is presented to the user so that the user can select the files from the list to be replaced during the upgrade. In step 202, the replacement of the original files with the files of the upgrade occurs. In this step, the files whose checksums were known as well as the files selected by the user from the list are replaced. Then, in step 204, another script is run to perform any further processing on the upgrade. In this manner, the upgrade of the application is handled without losing any customizations made by the user.

Figure 7:
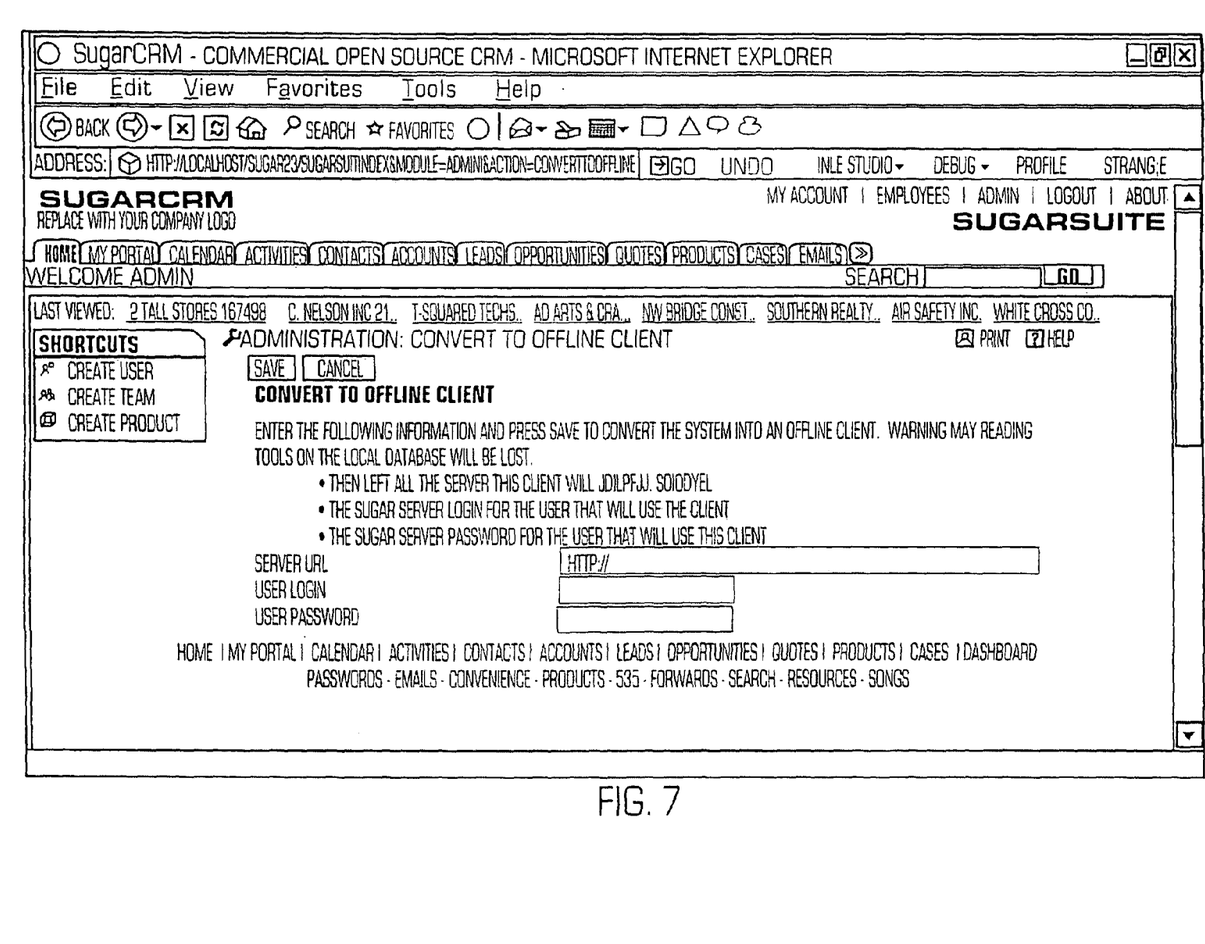
FIG. 7 is an example of a user interface for configuring an offline client of the system shown in FIG. 1.

FIG. 7 is an example of a user interface 210 for configuring an offline client of the system shown in FIG. 1. This user interface permits the system to configure the system and server to provide a connection to a mobile client. When this is done, the mobile client becomes a miniature version of the application and it will automatically sync all data that the specified username/password has, and also sync the application changes as well. The application code changes are synced in a per file basis, only files that are not the same between the client and the server are synced and all code syncs are one way in that they only go from the server to the client. Any metadata and schema changes are synced the same way. Any changes to the code, metadata, configuration, schema on the server are automatically synced to the client. These changes are also synced as deltas and there is no full sync after the first time.

Application data changes are synced bi-directionally and change on the client and the server are merged. This bidirectional synchronization updates both the client and the server with the latest changes from the other machine and handles conflict resolution. During the synchronization, the user gets a user interface that shows them the progress of the synchronization process.

The mobile client synchronization may also include a security feature. In particular, since the system software is developed in PHP and most PHP programs are plain text, the code is somewhat easy to steal. To deter that activity, an encoded/encrypted version of the source may be produced before copying it to mobile clients. The process for Mobile Sync with Code Encryption would be able to take the current code from the server, encrypt it completely into a binary executable form, and then send the encrypted application down to the mobile client. This allows for mobile client functionality, easy change and administration on the server (since it is still unencrypted on the server), and makes it very hard for mobile client users to modify or steal the source code of the application. This increases the integrity of the system on a global scale.

The mobile client in accordance with the invention may support a subset of the total number of modules available on the server. Currently the Home, Calendar, Accounts, Contacts, Leads, Opportunities, Quotes, Products, Forecasts, and Documents are supported. With the exception of the Document all data a user has access to (i.e., can see), is synced to their client. The Documents module will always sync the list of documents (i.e., titles) the user has access to, but not the actual files. To get specific files synced to the client a user must select the individual files they wish to have kept current on their client. This is done by accessing the list of Documents when disconnected and setting a flag on each document you want synced to your client. Once the flag is set for a document, new versions of the document (the actual file) will automatically be synced to the client on future sync operations. This is done as syncing all documents could potentially take a very long time. A mobile client does not send email or log audit operations. These operations are deferred and operated on by the server as records are synchronized.

In order to be an offline/mobile client, the system operating the mobile client must have the WAMP/LAMP stack installed prior to installing the Sugar Enterprise software. There is just one version of the Sugar Enterprise software once it is installed there are setup steps that configure it to work as an offline client. This insures the application works and looks the same when the user works connected to the server or disconnected via the offline client. On the server/system side, an administrator must create a valid login and password for the server for the mobile client. Now, the installation of the mobile client will be described. The steps include:

1. Install the WAMP/LAMP stack, just like you normally would for a Sugar server.
2. Install the Professional or Enterprise version of Sugar, creating a user and the database, but do not populate seed data.
3. Logon to the client system as admin.
4. Go to the Admin screen, select the "Repair" section then select "Convert to Offline Client". The screen from FIG. 7.
5. Specify the Sugar Servers URL. For example, http://localhost/sugar35
6. Specify the login user name and password the user of this client normally uses when connecting to the server (e.g., will, will).
7. Press the submit button, you will get a confirmation screen press the OK button to continue, or Cancel to exit the conversion steps. The conversion normally takes a minute or two.
   a. The sync processing initially verifies and copies over any application files modified or customized on the Sugar server. This insures that the client systems are automatically receive any modifications made to the server.
   b. During the sync process, the user may receive frequent updates as to the progress, the percent of the sync complete, and the current step in the process.
   c. Once the application files are synced the records accessible to the user are synced.
8. The screen should come back and say it was converted to an offline client.
9. At this time log out of the client install (you're still Admin), and login as the user that will have the client.
10. To insure everything is working correctly and to do the initial sync for the user. The Sync link is located near the Logout link. Select "Start Sync" The sync pop-up will appear and allow you to select the sync mode. Select "Prompt", and begin the sync operation. Sync processing should begin, and the progress bars will show how far in the process you are. The initial sync will take longer than normal daily sync operations as there is more data to move from the server to the client.
11. When the sync process is done it will indicate this in the pop-up.
    a. If any errors are encountered in the sync process they are logged in the sync.log file in the clients root directory. For example, C:/Program Files/Apache/htdocs/sugar35c/sync.log.
    b. The log can also be viewed via the sync pop-up by selecting the "details" link.

The system in accordance with the invention may also include a mechanism for tagging source code to use one code base for multiple products wherein comments are added to the files, the code, or the directories of the application. The tags are comments in the various languages that are used in the product. (e.g. end of line in php '//' or html comments . . . ) In this way, the default checked in version of the product is fully functional and does not require a build. This massively speeds up development.

The directory level tags can be used to remove directories from specific builds or only include them in specific builds. For instance if there is a module that is in our professional and enterprise builds only and is not in our open source product, the system may put a file in the folder of that module that tells the build process to remove the entire folder if it is not doing a professional or enterprise build. The file level tags can be used to remove entire files from specific builds or only include them in specific builds similar to the directory level tags example above except used for a particular file.

The code level tags can be used to remove sections of code specific builds or only include them in specific builds similar to the directory level tags example above except used for a piece of code. For the code level tags, a start tag can be placed before the code that we want to exclude and an end tag after the code. When the build process gets to code level tags, if the code in question is not appropriate for the current build, the tags and the code are stripped out of the source code. When the tags and the code are removed from the build, blank lines are put back in place to make the lines match up between all versions of the application. This is important for debugging since most error messages mention a line number. When debugging a problem, the developer does not typically have to have a specific build. As long as the code in question is in their particular build, the line number will be correct.

The system may also include PHP session security enhancements (using security source code) in accordance with the invention. PHP is a server side scripting language that is well known. To enhance PHP session security, the system may use an Application GUID and IP Address tracking. PHP sessions are tied to a specific server or specific server cluster, but they do not have any restrictions to a specific application or web folder on that server. This means that a user that is allowed to create a session in one PHP application on a server can hop that session over to another PHP application on the same server. Thus, the system uses an application ID. The application ID is a GUID that is randomly generated during the install (or end user specified during the install) that will be used to verify that the session the user is attempting to use with our application is a valid session for this particular application. Without this ID, the system and all of its contents are only as secure as the least secure PHP application that has been installed on the server.

The other security change is the tracking of the IP Address that the user is using the application from during the session. If another user tries to use the application from a completely different IP address, this is detected, the user is denied, and the session is destroyed because it is considered compromised. The default behavior is to let all IP addresses with the same first three octets in their IP addresses (e.g. 192.168.1.xxx where xxx can be any numbers) will be considered the same IP. This allows for load balancing of outbound traffic without tripping the security mechanism. However, the system may also be configured to be more strict. The security source code prevents end users from accessing one of the module files directly as all entry points in the application must be declared. In addition, any breach in security or perceived breach in security will result in the session in question being destroyed to prevent systematic attacks.

The system also provides calendar synchronization between the system and Outlook. Thus, the system has an interface and API with Outlook so that the free/busy indication in an Outlook calendar may be merged into the meetings stored in the system. In more detail, the system will accept and respond to Outlook free/busy API calls. When the user configures an Outlook free/busy server, it will post all of the times in which you are scheduled to be in a meeting over the next 2 months to the server. It will also check to see when other people are available when you are scheduling a meeting using the same free/busy server. In addition to storing and repeating the free/busy information for users that are subscribed, the system goes a little bit deeper. In particular, when the free/busy information for a user is requested, we produce a single list of all the busy blocks of time from both the outlook data from that user (if available) and the meetings recorded in the system. This provides a single combined list of busy times to Outlook when people are trying to schedule meetings. In addition, when looking at the calendar in the system you will see the combined list of busy blocks for your system meetings and the meetings you have scheduled in Outlook. When scheduling a meeting with other people, you will also get the system and Outlook meetings for each invited user. The calendar synchronization may also be provided for other external calendar programs such as Lotus® Domino, Google® Calendar, Oracle® Calendar, SAP® Calendar, Zimbra® Calendar, Scalix® Calendar or Novel® Groupwise.

The system may further include a business card screen that provides the user of the system with a quick entry form for creating items from business cards. The business card screen allows users to quickly enter the information contained on a common business card and also create follow up items and additional notes at the same time. This single screen allows for the quick entry of an entire contact, account, opportunity, notes, tasks, calls, meetings, . . . in one round trip to the server. This not only presents the information is a user friendly format, it also saves the user a lot of time.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A computer system comprising a processor and memory, the system comprising a computer program stored in fixed storage of the computer system that when loaded into the memory of the computer system, performs an upgrade method for an open source software application, the method comprising: receiving an upgrade package to upgrade an existing open source software application;
    identifying, for each file in the upgrade package, if the file does not match a prior version of the file in order to indicate a file in the existing open source software application that has been customized;
    automatically upgrading the files in the upgrade package that are not identified as being customized; and
    selectively, based on one of user instructions and default logic, upgrading the files identified as being customized so that the customizations from the existing open source software application are not lost during the upgrade process.

2. The system of claim 1, wherein identifying the customized file further comprises computing a checksum for each file in the upgrade package and comparing the computed checksum against known checksum values for the file from a previously installed version of the software application.

3. The system of claim 2, wherein computing the checksum further comprises computing an MD5 checksum.

4. The system of claim 2, wherein computing the checksum further comprises computing an MD5 checksum that is independent of line feeds, source code control system tags, and/or changes to whitespace in the source code.

5. A computer program product for upgrading an open source software application, the computer program product comprising:
   a non-transitory computer readable storage medium having computer readable program code embodied therewith, the computer readable program code comprising:
   computer readable program code for receiving an upgrade package to upgrade an existing open source software application;
   computer readable program code for identifying, for each file in the upgrade package, if the file does not match a prior version of the file in order to indicate a file in the existing open source software application that has been customized;
   computer readable program code for automatically upgrading the files in the upgrade package that are not identified as being customized; and
   computer readable program code for selectively, based on one of user instructions and default logic, upgrading the files identified as being customized so that the customizations from the existing open source software application are not lost during the upgrade process.

6. The computer program product of claim 5, wherein the computer readable program code for identifying the customized file further comprises computer readable program code for computing a checksum for each file in the upgrade package and comparing the computed checksum against known checksum values for the file from a previously installed version of the software application.

7. The computer program product of claim 6, wherein the computer readable program code for computing the checksum further comprises computer readable program code for computing an MD5 checksum.

8. The computer program product of claim 6, wherein the computer readable program code for computing the checksum further comprises computer readable program code for computing an MD5 checksum that is independent of line feeds, source code control system tags, and/or changes to whitespace in the source code.

* * * * *